(12) United States Patent
Mine et al.

(10) Patent No.: US 11,889,179 B2
(45) Date of Patent: Jan. 30, 2024

(54) IMAGE CAPTURING PROGRAM, INFORMATION PROCESSING DEVICE, AND METHOD FOR CHANGING AN IMAGE CAPTURING PARAMETER OF A CAMERA

(71) Applicant: Sony Group Corporation, Tokyo (JP)

(72) Inventors: Hiroki Mine, Tokyo (JP); Yuka Jingushi, Tokyo (JP); Sho Kobayashi, Tokyo (JP); Dickinson Forrest Jr. Matthew, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/631,494

(22) PCT Filed: Oct. 2, 2019

(86) PCT No.: PCT/JP2019/039016
§ 371 (c)(1),
(2) Date: Jan. 31, 2022

(87) PCT Pub. No.: WO2021/044638
PCT Pub. Date: Mar. 11, 2021

(65) Prior Publication Data
US 2022/0279114 A1    Sep. 1, 2022

(30) Foreign Application Priority Data

Sep. 5, 2019  (WO) .................. PCT/JP2019/035094

(51) Int. Cl.
*H04N 23/62*  (2023.01)
*H04N 23/67*  (2023.01)
*H04N 23/63*  (2023.01)

(52) U.S. Cl.
CPC .......... *H04N 23/62* (2023.01); *H04N 23/631* (2023.01); *H04N 23/633* (2023.01); *H04N 23/67* (2023.01)

(58) Field of Classification Search
CPC .... H04N 23/62; H04N 23/631; H04N 23/633; H04N 23/67; H04N 23/632; G06F 3/04845; G06F 3/04847; G03B 17/18
See application file for complete search history.

(56) References Cited

U.S. PATENT DOCUMENTS 8,184,168 B2 * 5/2012 Kindborg ......... G08B 13/19676
348/211.11
2004/0165879 A1  8/2004 Sasaki et al.
(Continued)

FOREIGN PATENT DOCUMENTS

JP  2004-280048 A  10/2004
JP  2004-287180 A  10/2004
(Continued)

OTHER PUBLICATIONS

International Search Report and Written Opinion dated Nov. 26, 2019, received for PCT Application PCT/JP2019/039016, Filed on Oct. 2, 2019, 10 pages including English Translation.

*Primary Examiner* — Padma Haliyur
(74) *Attorney, Agent, or Firm* — XSENSUS LLP

(57) ABSTRACT

A program causes an information processing device to execute: starting image capturing by using a camera communicably connected to the information processing device; changing a parameter for the image capturing by using the camera to a predetermined first value during the image capturing by using the camera; and changing the parameter to a predetermined second value. Therefore, it is possible to assist in manual operation of the image capturing parameter. This makes it possible to easily achieve a more detailed and (Continued)

accurate image capturing parameter operation, which in turn easily achieve an advanced image capturing technique.

20 Claims, 10 Drawing Sheets

(56) References Cited

U.S. PATENT DOCUMENTS

| | | | |
|---|---|---|---|
| 2013/0022343 A1 | 1/2013 | Ozeki | |
| 2014/0085233 A1* | 3/2014 | Sudo | G06F 3/041 345/173 |
| 2015/0124143 A1* | 5/2015 | Ichihara | H04N 23/633 348/333.03 |
| 2016/0353032 A1 | 12/2016 | Ichihara | |
| 2017/0064192 A1 | 3/2017 | Mori | |
| 2017/0187946 A1 | 6/2017 | Kozakura | |
| 2018/0176458 A1 | 6/2018 | Tsuchiya | |

FOREIGN PATENT DOCUMENTS

| | | |
|---|---|---|
| JP | 2006-54785 A | 2/2006 |
| JP | 2008-17513 A | 1/2008 |
| JP | 2009122289 A | 6/2009 |
| JP | 2012-98510 A | 5/2012 |
| JP | 2014-110596 A | 6/2014 |
| JP | 2018-101930 A | 6/2018 |

\* cited by examiner

IMAGE CAPTURING PROGRAM, INFORMATION PROCESSING DEVICE, AND METHOD FOR CHANGING AN IMAGE CAPTURING PARAMETER OF A CAMERA

CROSS-REFERENCE TO RELATED APPLICATIONS

The present application is based on PCT filing PCT/JP2019/039016, filed Oct. 2, 2019, which claims priority to PCT/JP2019/035094, filed Sep. 5, 2019, the entire contents of each are incorporated herein by reference.

FIELD

The present disclosure relates to an image capturing program, an information processing device, and a method.

BACKGROUND

In recent years, with the development of a digital camera technology, even a general user who does not have knowledge regarding a camera can easily take beautiful pictures (images) and videos (moving images) by using an inexpensive camera, smartphone, or the like. For example, operation performed by the user is substantially only to press an image capturing button, and the camera automatically adjusts various parameters for image capturing (hereinafter, those parameters will also be collectively referred to as "image capturing parameters") such as focus and exposure and performs image capturing.

CITATION LIST

Patent Literature

Patent Literature 1: JP 2012-098510 A

SUMMARY

Technical Problem

However, when manually adjusting the image capturing parameters by himself/herself without depending on an automatic function of the camera, the user can capture a preferable and special image or moving image. Meanwhile, such a manual operation is not easy, and, in a case of capturing a moving image in particular, there is an advanced image capturing technique of adjusting the image capturing parameters during image capturing (e.g., a pull focus or focus pull technique of capturing an image while changing focus in the same shot). Therefore, the user cannot perform image capturing as expected by manual operation in many cases, and, besides, it is impossible to use the advanced image capturing technique unless the user is an expert. Such a problem occurs not only in a manual operation of the focus but also in manual operations of other image capturing parameters that are adjusted at the time of image capturing by using the camera, such as a zoom, the f-number (aperture), a shutter speed, and exposure.

Therefore, the present disclosure proposes an image capturing program, an information processing device, and a method capable of assisting in manual operation of an image capturing parameter.

Solution to Problem

The present disclosure proposes a program for causing an information processing device to execute changing a parameter for image capturing by a camera connected to the information processing device, to a predetermined first value in response to a first user input.

The present disclosure proposes an information processing device comprising a control unit that changes a parameter for image capturing by a camera connected to the information processing device, to a predetermined first value in response to a first user input.

The present disclosure proposes a method, wherein an information processing device executes changing a parameter for image capturing by a camera connected to the information processing device, to a predetermined first value in response to a first user input.

DESCRIPTION OF EMBODIMENTS

Hereinafter, embodiments of the present disclosure will be described in detail with reference to the drawings. In the present specification and the drawings, substantially the same parts are denoted by the same reference signs, and repeated description thereof will be omitted.

Description will be provided in the following order.
1. Embodiment
1.1. Functional configuration example
1.2. Details of functions
2. Modification example of embodiment
3. Hardware configuration example
4. Summary

1. Embodiment

1.1. Functional Configuration Example

First, a functional configuration example of an information processing device 10 according to the present embodiment will be described. The information processing device 10 may be a digital camera, a digital video camera, or a mobile terminal such as a smartphone or tablet personal computer (PC).

Figure 1:
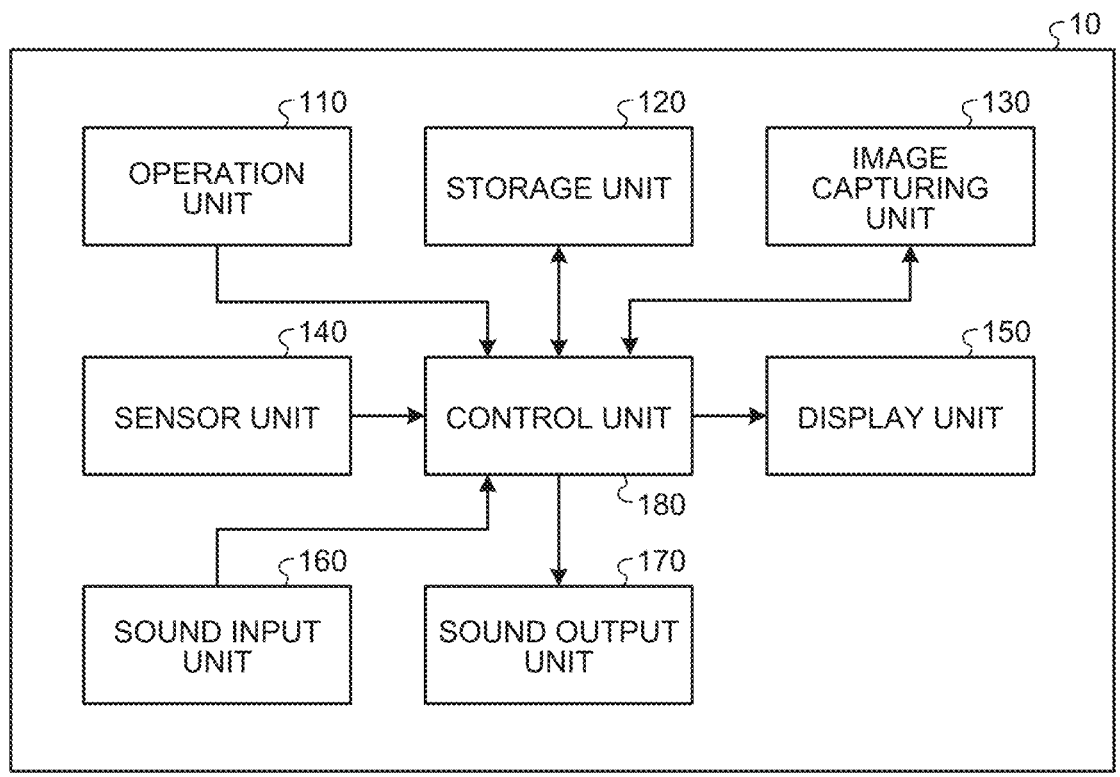
FIG. 1 is a block diagram illustrating a functional configuration example of an information processing device 10 according to the present embodiment.

FIG. 1 is a block diagram illustrating a functional configuration example of the information processing device 10 according to the present embodiment. As illustrated in FIG. 1, the information processing device 10 according to the present embodiment includes an operation unit 110, a storage unit 120, an image capturing unit 130, a sensor unit 140, a display unit 150, a sound input unit 160, a sound output unit 170, and a control unit 180.

(Operation Unit 110)

The operation unit 110 according to the present embodiment detects various user operations on a camera application or the like. The above operations include, for example, a touch operation and an operation of a physical button provided in the information processing device 10. Herein, the touch operation indicates various touch operations on the display unit 150 such as tapping, double tapping, swiping, and pinching. The touch operation also includes an operation of bringing an object such as a finger close to the display unit 150. For this purpose, the operation unit 110 includes, for example, a touchscreen, a button, a keyboard, a mouse, and a proximity sensor. The operation unit 110 detects a user operation on a user interface (UI) of the camera application displayed on the display unit 150 and inputs information regarding the detected user operation to the control unit 180. Herein, examples of the information regarding the user operation include the type of touch operation performed by the user, information on a position (screen coordinates) at which the operation has been performed, and input image capturing parameters (examples of a first value, a second value, and a third value).

(Storage Unit 120)

The storage unit 120 according to the present embodiment is a storage area for temporarily or permanently storing various programs and data. For example, the storage unit 120 may store programs and data for the information processing device 10 executing various functions. As a specific example, the storage unit 120 may store a program for executing the camera application and management data for managing various settings. The image capturing parameters input by the user via the UI of the camera application may also be stored. As a matter of course, the above is merely an example, and the type of data to be stored in the storage unit 120 is not particularly limited.

(Image Capturing Unit 130)

The image capturing unit 130 according to the present embodiment captures a moving image under the control of the control unit 180. A smartphone, which is an example of the information processing device 10, includes a main camera for capturing an image of a subject on a back side of the display unit 150 and a front camera for capturing an image of the user's face or the like on the display unit 150 side. The image capturing unit 130 includes an imaging element, a focus ring, a zoom lens, and the like. In the present embodiment, image capturing by using the main camera is controlled as an example. A moving image captured by the image capturing unit 130 is stored in the storage unit 120. The moving image captured by the image capturing unit 130 is stored together with voice and environmental sound collected by the sound input unit 160 during image capturing. The moving image captured by the image capturing unit 130 and stored in the storage unit 120 includes a moving image captured during image capturing and a moving image to be displayed as a preview on the display unit 150 or the like at times other than during the image capturing. The former moving image is displayed on the display unit 150 and is temporarily stored in a random access memory (RAM) and is then stored in a read only memory (ROM). The latter moving image is also temporarily stored in the RAM, but is deleted in order from the oldest when the RAM reaches a maximum capacity, and is not stored in the ROM.

(Sensor Unit 140)

The sensor unit 140 according to the present embodiment has a function of collecting sensor information regarding behavior of the user by using various sensors. The sensor unit 140 includes, for example, an acceleration sensor, a gyro sensor, a geomagnetic sensor, a vibration sensor, and a global navigation satellite system (GNSS) signal receiver. For example, the sensor unit 140 detects that the user holds the information processing device 10 horizontally by using the gyro sensor and inputs the detected information to the control unit 180.

(Display Unit 150)

The display unit 150 according to the present embodiment displays various kinds of visual information under the control of the control unit 180. The display unit 150 may display, for example, an image, a character, and the like related to the application. Specifically, examples thereof include the user interface of the camera application and the subject to be captured by the image capturing unit 130. For this purpose, the display unit 150 includes various display devices such as a liquid crystal display (LCD) device and an organic light emitting diode (OLED) display device.

(Sound Input Unit 160)

The sound input unit 160 according to the present embodiment collects voice, environmental sound, and the like around the information processing device 10 under the control of the control unit 180. For this purpose, the sound input unit 160 includes a microphone or the like.

(Sound Output Unit 170)

The sound output unit 170 according to the present embodiment outputs various sounds and voices. The sound output unit 170 outputs, for example, a sound or voice according to a situation of the camera application under the control of the control unit 180 (e.g., emits a sound at the start or end of image capturing). For this purpose, the sound output unit 170 includes a speaker and an amplifier.

(Control Unit 180)

The control unit 180 according to the present embodiment controls each configuration included in the information processing device 10. One of features of the control unit 180 is to control image capturing by using the camera. The image capturing control includes adjusting the image capturing parameter on the basis of a user input via the UI, operating the focus ring or the like included in the image capturing unit 130 on the basis of the image capturing parameter, and the like. Details of the functions of the control unit 180 will be described later.

The functional configuration example of the information processing device 10 according to the present embodiment has been described above. The functional configuration described above with reference to FIG. 1 is merely an example, and the functional configuration of the information processing device 10 according to the present embodiment is not limited to such an example. For example, the information processing device 10 does not necessarily need to include all the configurations illustrated in FIG. 1, and each configuration such as the sound input unit 160 can be included in a device other than the information processing device 10. The functional configuration of the information processing device 10 according to the present embodiment can be flexibly modified according to specifications and operations.

Further, the function of each component may be performed in such a way that an arithmetic unit such as a central processing unit (CPU) reads a control program in which a processing procedure for achieving those functions is written from a storage medium such as a ROM or RAM storing the control program and interprets and executes the program. Therefore, it is possible to appropriately change the configuration to be used in accordance with the technical level at the time of carrying out the present embodiment. An example of a hardware configuration of the information processing device 10 will be described later.

1.2. Details of Functions

Next, functions of the information processing device 10 according to the present embodiment will be described in detail. One of the features of the control unit 180 of the information processing device 10 according to the present embodiment is to assist in manual operation of the image capturing parameter by using the camera application. The camera application is used by being installed in the information processing device 10 in advance. The camera application may be activated by the user at the time of image capturing or the like or may be automatically activated when an OS of the information processing device 10 is activated. The camera application may also be activated and used in the form of an expansion program of another camera application or the like.

Figure 2:
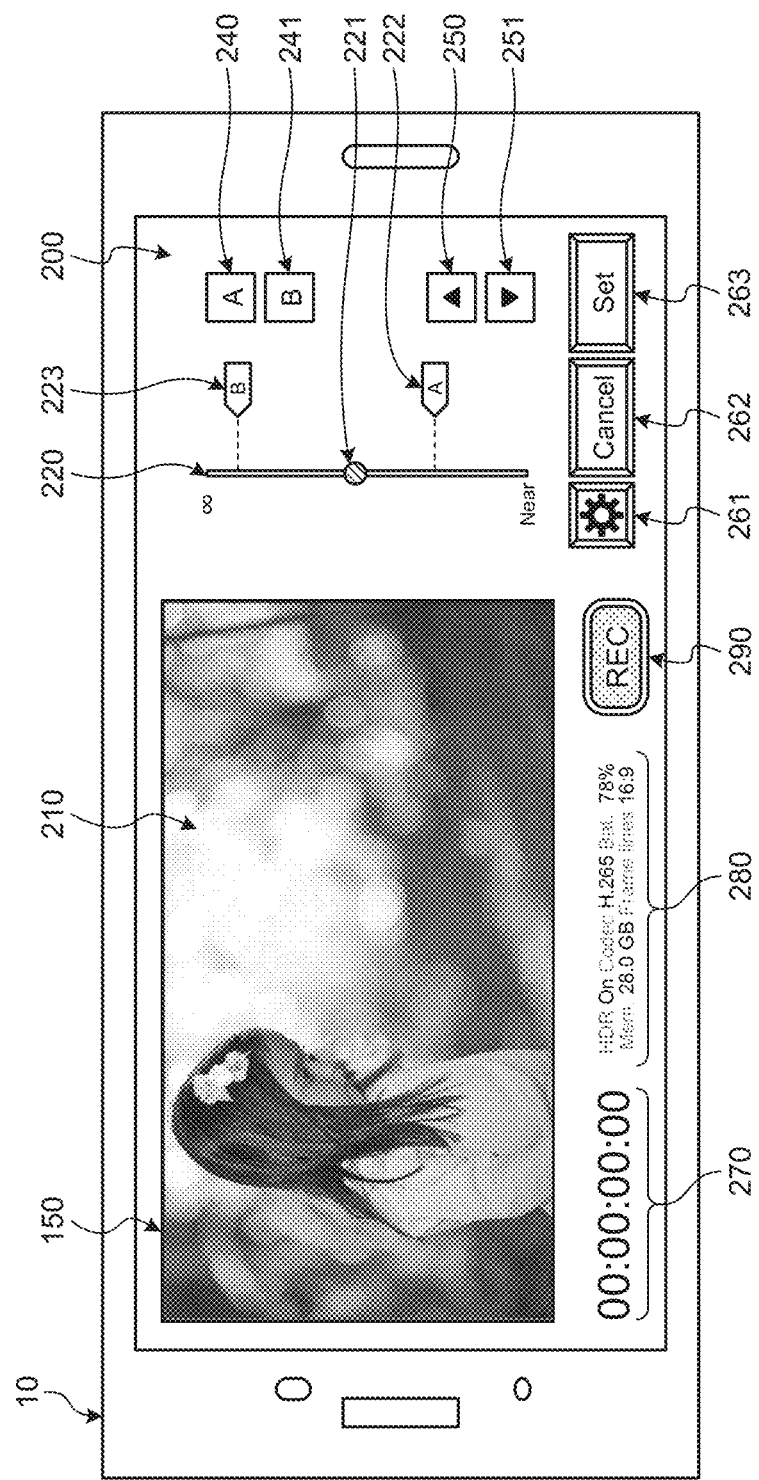
FIG. 2 illustrates an example of a camera application according to the embodiment.

FIG. 2 illustrates an example of an operation related to menu display of the camera application according to the present embodiment. FIG. 2 illustrates an example where the information processing device 10 is a smartphone and the user turns the smartphone to a horizontal position and captures a moving image by using a UI 200 of the camera application. In the example of FIG. 2, the UI 200 of the camera application is displayed on the display unit 150 in a full screen and a horizontal screen, but is not limited to such a display mode. For example, when the user turns the information processing device 10 to a vertical position, the sensor unit 140 can detect the turning, and the control unit 180 can display the UI 200 of the camera application on the display unit 150 in a vertical screen. For example, in a case where the camera application functions as an expansion program of another camera application or the like, the UI 200 of the camera application can also be superimposed and displayed on a UI of the another camera application or the like.

The UI 200 of the camera application can include a subject display portion 210, a slider 220, a slider button 221, an A marker 222, a B marker 223, an A button 240, a B button 241, an up button 250, a down button 251, a setting change button 261, a cancel button 262, a setting button 263, an image capturing time display portion 270, various-pieces-of-information display portion 280, an image capturing button 290, and the like.

The subject display portion 210 displays a subject captured and converted into digital data by the image capturing unit 130. Even in a case where the subject is displayed on the subject display portion 210, image capturing is not performed until the user's intention to capture an image is confirmed by, for example, pressing the image capturing button 290. The subject to be displayed is taken in after the focus or the like is adjusted on the basis of the image capturing parameter. The user can perform a tap operation on the subject display portion 210 to use an autofocus function of focusing on the tapped position.

The slider 220 and the slider button 221 are input units for the user to operate the image capturing parameter. For example, the user can change the image capturing parameter by dragging and dropping the slider button 221 along the slider 220. When a position of the slider button 221 is changed by a user operation, the operation unit 110 detects the change, and the control unit 180 changes the image capturing parameter. The control unit 180 performs control to take in the subject via the image capturing unit 130 and display the subject on the subject display portion 210 on the basis of the changed image capturing parameter.

The example of FIG. 2 illustrates the slider 220 and the slider button 221 as input units for changing the focus. Therefore, when the slider button 221 is slid upward (∞ direction), a far subject comes into focus, and, when the slider button is slid downward (Near direction), a near subject comes into focus. Regarding display of "∞" and "Near" in the slider 220, in a case where the image capturing parameter is other than the focus, contents of display and the number of pieces of display can be changed for each image capturing parameter. Examples of the image capturing parameters other than the focus include a zoom, the f-number (aperture), a shutter speed, and exposure, but are not limited thereto. For example, in a case where the image capturing parameter to be changed is the f-number, it is also possible to display the f-numbers in detail, such as "1", "1.4", "2", "2.8", "4", "5.6", "8", "11", and "16". As described above, the slider 220 and the slider button 221 are used to input a relative value of the image capturing parameter.

Although details of the A marker 222, the B marker 223, the A button 240, and the B button 241 will be described later, those buttons are input units for assisting in manual operation of the image capturing parameter. The A marker 222 and the B marker 223, as well as the slider button 221, can be slid along the slider 220, but, unlike the slider button 221, the image capturing parameter is not changed. The A marker 222 and the B marker 223 merely play an auxiliary role, and the slider button 221 moves to the A marker 222 or the B marker 223 when the A button 240 or the B button 241 is pressed. With this, the slider button 221 moves, and, as a result, the image capturing parameter is changed (the changed image capturing parameter is also reflected in the subject displayed on the subject display portion 210).

Note that "A" and "B" in the A marker 222, the B marker 223, the A button 240, and the B button 241 do not have a concept of order and may be any number, symbol, or the like as long as they can be distinguished from each other. An input by pressing the A button 240 and the B button 241 is an example of a first user input and a second user input. Also in this case, the A button 240 and the B button 241 do not have the concept of order. Therefore, for example, an input by pressing the A button 240 can be the first user input or the second user input (the same applies to an input by pressing the B button 241).

The up button 250 and the down button 251 are buttons for slightly adjusting the slider button 221. For example, the slider button 221 moves upward along the slider 220 while the user is pressing the up button 250. Alternatively, when the user presses the up button 250, the slider button 221 may move upward along the slider 220 by a certain amount. When the user presses the down button 251, the slider button 221 moves downward along the slider 220. An amount of movement of the slider button 221 by using the up button 250 or the down button 251 may be freely changed by the user.

The setting change button 261 is a button for changing various settings. For example, when the user presses the setting change button 261, a setting change screen (not illustrated) or the like is displayed, and an arrival time of the slider button 221 to each marker when the A button 240 or the B button 241 is pressed (e.g., 0.1 to 3.0 seconds; an example of a time period from a response to the first user input or the second user input to a change to a first value or the second value), the amount of movement of the slider button 221 by using the up button 250 or the down button 251, or the like can be changed.

The cancel button 262 is a button for discarding each input value. For example, the user can return positions of the moved A marker 222, B marker 223, and slider button 221 to an initial state by pressing the cancel button 262. Herein, the initial state is, for example, when the camera application is activated or when the setting button 263 is pressed. Alternatively, when the cancel button 262 is pressed, the camera application may simply be terminated without storing each input value, or the UI 200 of the camera application may transition to another screen.

The setting button 263 is a button for storing each input value. For example, when the user presses the setting button 263, the positions of the moved A marker 222, B marker 223, and slider button 221 are stored in the storage unit 120 by the control unit 180. Each stored input value can also be automatically set in the UI 200 of the camera application as an initial setting next time when the camera application is activated or when the UI 200 of the camera application is displayed. Each input value by pressing the setting button 263 can also be stored in a plurality of patterns, and the user can freely call and use a desired pattern via the UI 200 of the camera application. This eliminates the need for the user to input the positions of the A marker 222, the B marker 223, and the slider button 221 every time.

The image capturing time display portion 270 is a display unit for displaying elapsed time from the start of image capturing. As illustrated in FIG. 2, the image capturing time display portion 270 can display, for example, not only hour, minute, and second but also up to $1/100$ second, but is not limited thereto.

The various-pieces-of-information display portion 280 is a display unit for displaying various kinds of information necessary for image capturing. Examples of the various kinds of information include on/off of a high dynamic range (HDR) function and a remaining battery level of the information processing device 10, but are not limited thereto.

The image capturing button 290 is a button for starting or stopping capturing of a moving image. For example, the user can capture a moving image of the subject displayed on the subject display portion 210 by pressing the image capturing button 290.

The contents of display on the UI 200 of the camera application in FIG. 2 are merely examples and are not limited thereto. Buttons, displays, and the like for using various functions of the camera application can be increased or decreased, and arrangement thereof can be changed. The contents, shapes, colors, sizes, transmittances, and the like of various displays on the UI 200 of the camera application are also examples.

Figure 3:
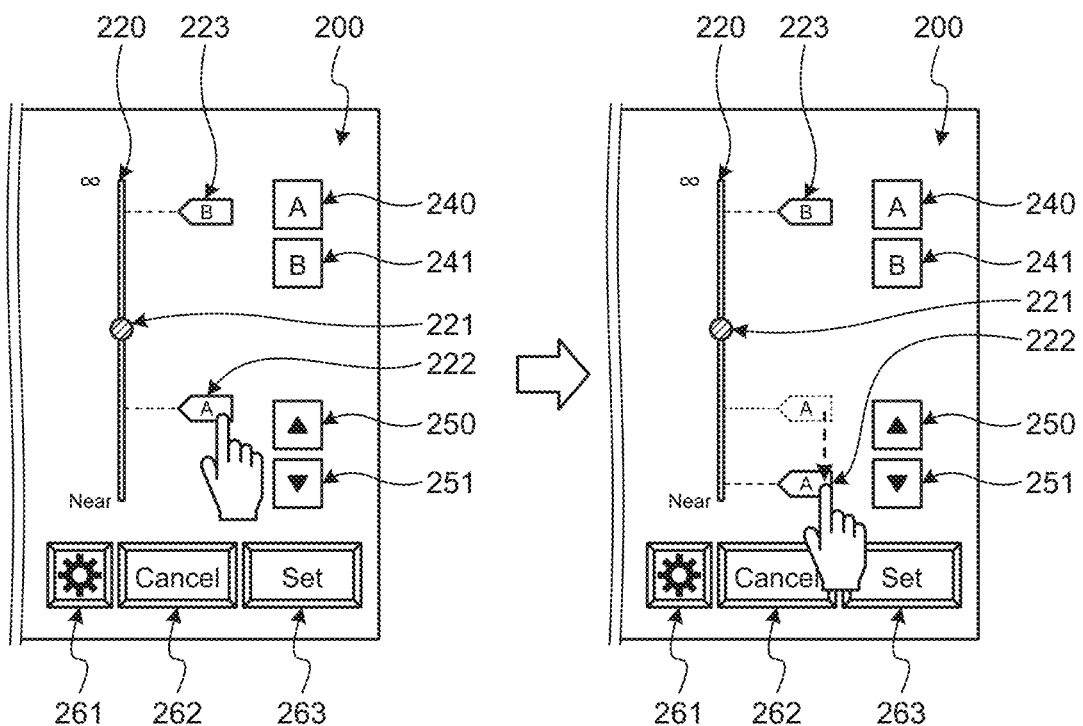
FIG. 3 illustrates an example of an operation related to a marker setting of the camera application according to the embodiment.

FIG. 3 illustrates an example of an operation related to a marker setting of the camera application according to the present embodiment. FIG. 3 illustrates a method of directly operating and setting the A marker 222 or the B marker 223 by exemplifying the A marker 222. Therefore, the B marker 223 can also be set by performing a similar operation on the B marker 223. FIG. 3 illustrates only a right part of the UI 200 of the camera application in FIG. 2 for the sake of convenience (the same applies to FIGS. 4, 7, and 8).

A left part of FIG. 3 illustrates a state in which the user attempts to perform a touch operation on the A marker 222 in order to set the A marker 222. A right part of FIG. 3 illustrates a state in which the user has set the A marker 222 by a drag and drop operation. When the A marker 222 is simply moved, the image capturing parameter (focus in the present embodiment) is not changed, and the subject displayed on the subject display portion 210 is also not changed. Therefore, in a case where the user wants to see how much the captured subject changes due to the image capturing parameter corresponding to a position of the moved A marker 222, the user needs to move the slider button 221 to the position of the A marker 222 by a touch operation or to press the A button 240. With this operation, the image capturing parameter is changed, and thus the subject in which the changed image capturing parameter has been reflected is displayed on the subject display portion 210.

Figure 4:
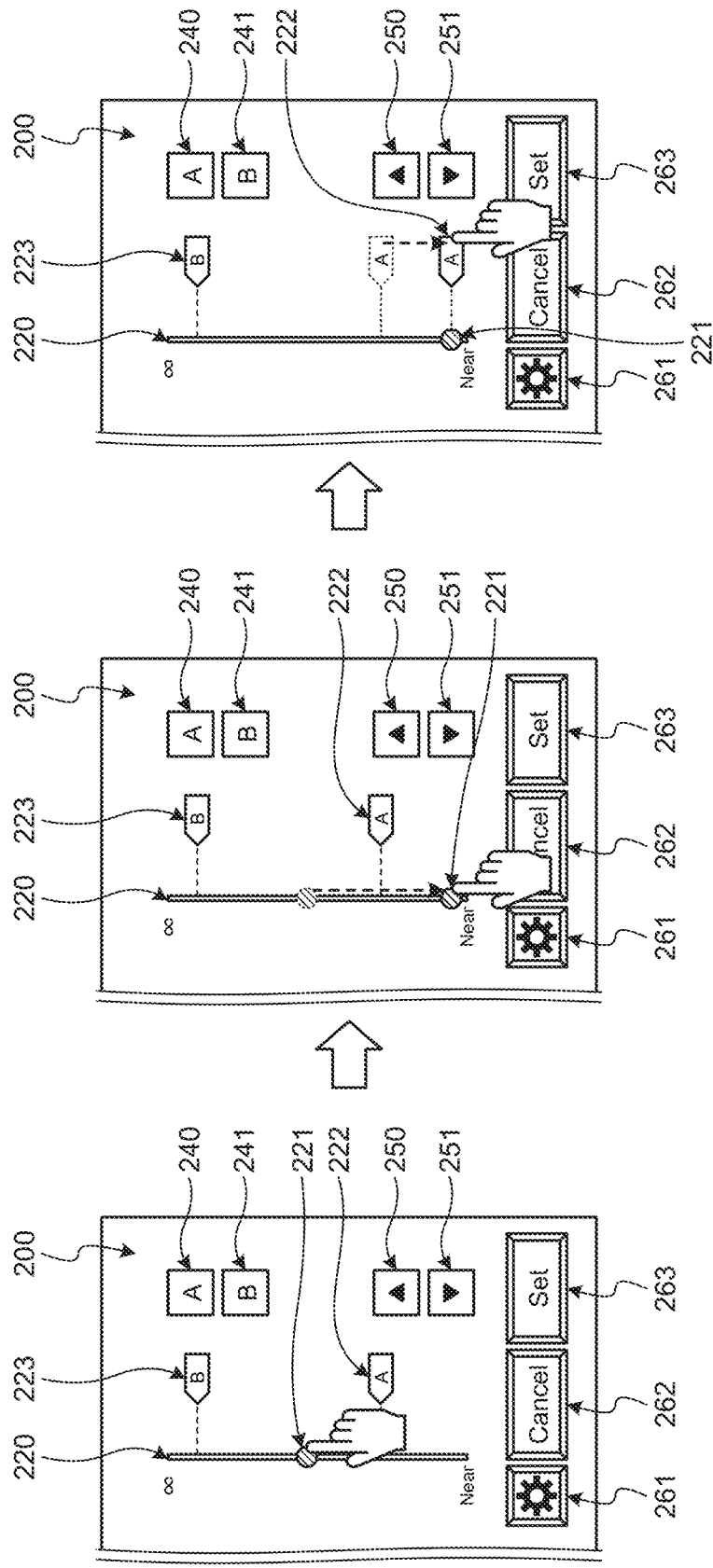
FIG. 4 illustrates an example of an operation related to a marker setting of the camera application according to the embodiment.

FIG. 4 illustrates an example of an operation related to a marker setting of the camera application according to the present embodiment. FIG. 4 illustrates a method of adjusting the image capturing parameter by operating the slider button 221 and then operating and setting the A marker 222 or the B marker 223 by exemplifying the A marker 222 (the B marker 223 can also be set by a similar operation).

A left part of FIG. 4 illustrates a state in which the user attempts to perform a touch operation on the slider button 221 in order to move the slider button 221. A middle part of FIG. 4 illustrates a state in which the slider button 221 is moved by a drag and drop operation. The image capturing parameter is changed by moving the slider button 221, and thus the changed image capturing parameter is reflected in the subject displayed on the subject display portion 210. Accordingly, the user can visually confirm an amount of change in the image capturing parameter and can therefore perform a more detailed marker operation. The operation of the slider button 221 can also be performed by using the up button 250 and the down button 251. In a case where the information processing device 10 is a smartphone or the like, the display unit 150 may be small, and it may be difficult to perform a detailed operation of the slider button 221. Particularly in this case, the user can perform a detailed operation of the slider button 221 by using the up button 250 and the down button 251.

A right part of FIG. 4 illustrates a state in which the user has set the A marker 222 to the position of the slider button 221 by a drag and drop operation. It is also possible to set (snap) the A marker 222 by attracting the A marker to the position of the slider button 221 when the A marker 222 is moved near the slider button 221. This makes it easier for the user to accurately operate the A marker 222.

Figure 5:
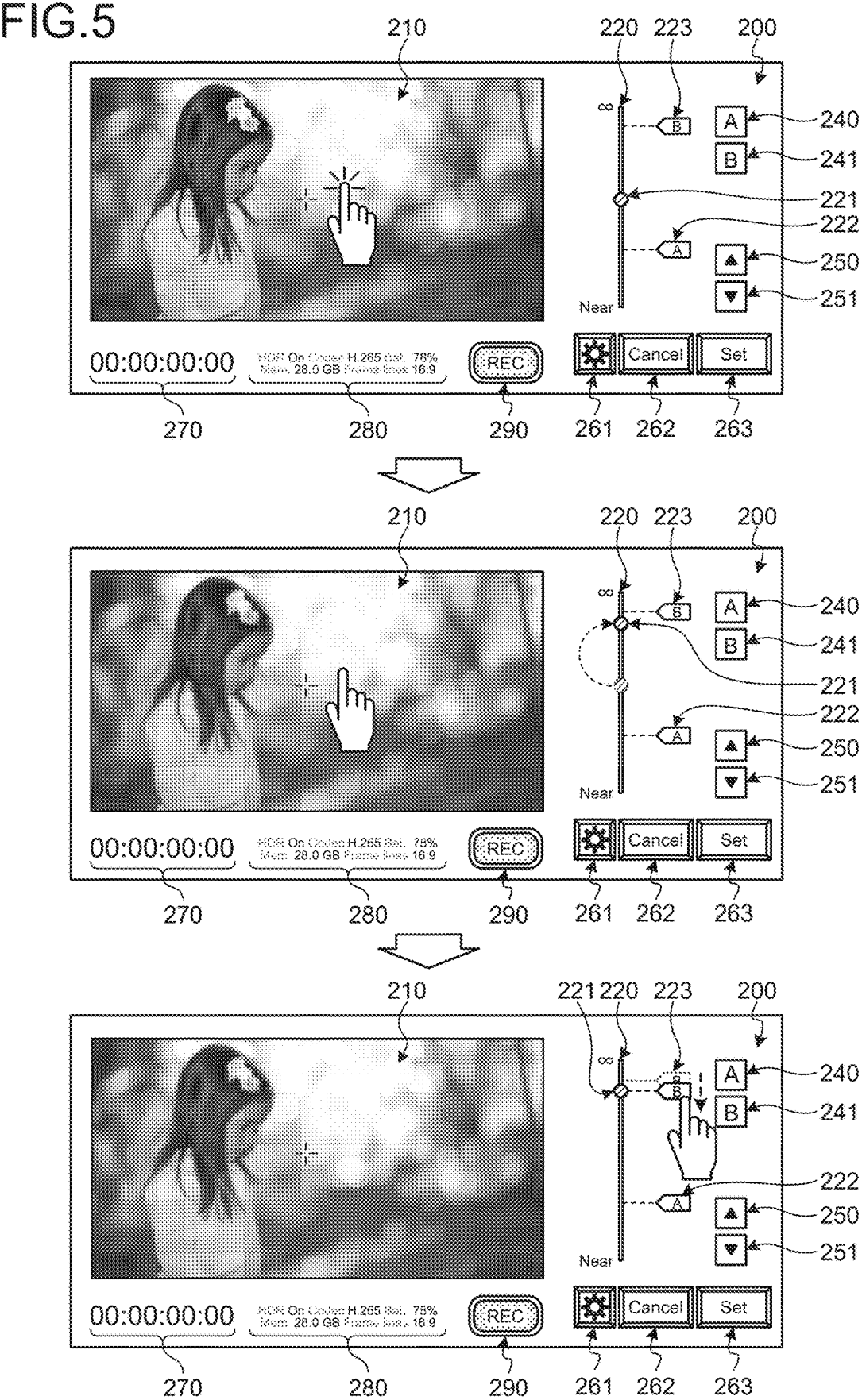
FIG. 5 illustrates an example of an operation related to a marker setting of the camera application according to the embodiment.

FIG. 5 illustrates an example of an operation related to a marker setting of the camera application according to the present embodiment. FIG. 5 illustrates a method of adjusting the image capturing parameter (focus) by using the autofocus function of the camera application and then operating and setting the A marker 222 or the B marker 223 by exemplifying the B marker 223 (the A marker 222 can also be set by a similar operation).

An upper part of FIG. 5 illustrates a state in which the user taps the subject displayed on the subject display portion 210 in order to adjust the focus on the subject by using the autofocus function. By a tap operation (an example of a sixth user input) on the subject displayed on the subject display portion 210, the operation unit 110 detects the tap operation and the tapped position. Then, the operation unit 110 inputs information on the tapped position and the like to the control unit 180, and the control unit 180 operates the focus ring included in the image capturing unit 130 so that the tapped position comes into focus.

Therefore, as illustrated in a middle part of FIG. 5, the subject display portion 210 displays the subject in focus at the tapped position. Further, as illustrated in the middle part of FIG. 5, the control unit 180 moves the slider button 221 to a position corresponding to the adjusted focus. A lower part of FIG. 5 illustrates a state in which the user has set the B marker 223 to the position of the slider button 221 by a drag and drop operation. In this way, the user can accurately operate the B marker 223.

By setting the A marker 222 and the B marker 223 to predetermined positions by the operations illustrated in FIG. 3 to 5 as described above and pressing the setting button 263, the positions of the A marker 222 and the B marker 223 (strictly speaking, the image capturing parameters corresponding to the respective positions) are stored in the storage unit 120 by the control unit 180. The positions of the slider button 221 (examples of a seventh user input) can also be stored and be used as initial values of the image capturing parameter at the start of image capturing.

Figure 6:
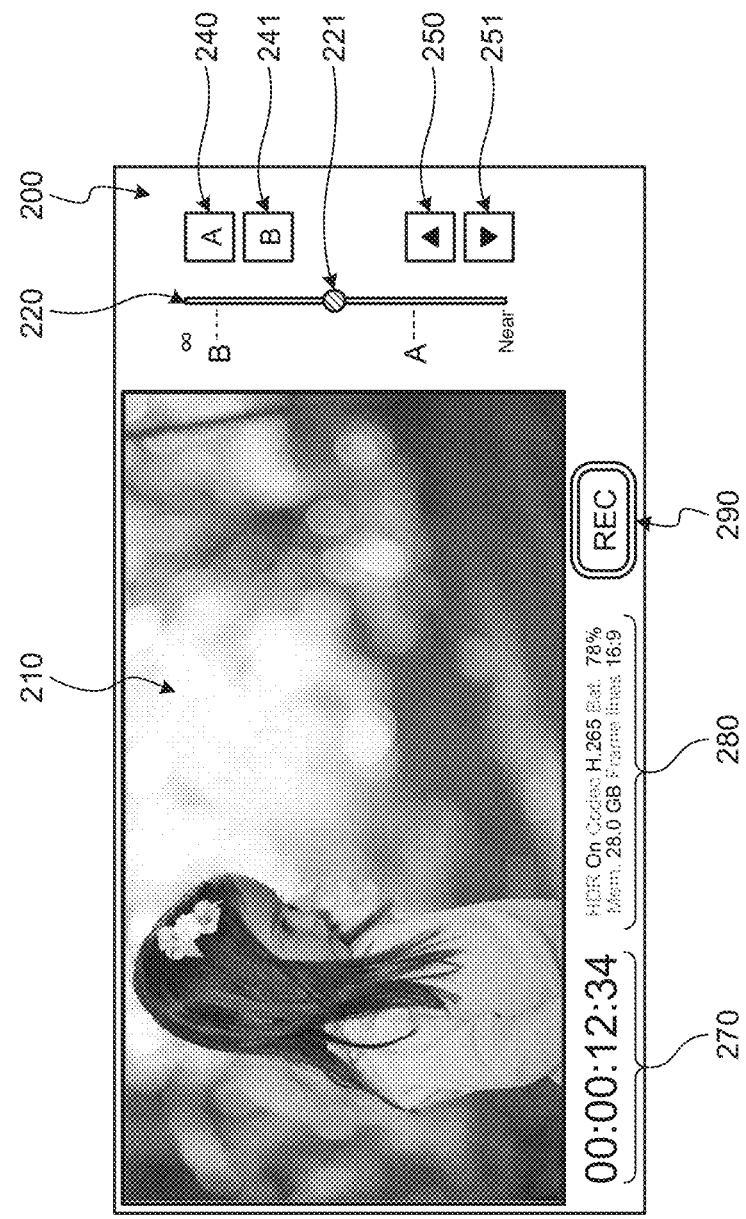
FIG. 6 illustrates an example of the camera application according to the embodiment during image capturing.

FIG. 6 illustrates an example of the camera application according to the present embodiment during image capturing. When the user presses the image capturing button 290, the image capturing unit 130 starts image capturing of the subject displayed on the subject display portion 210. When the image capturing is started, time on the image capturing time display portion 270 advances as illustrated in FIG. 6. In order to prevent an erroneous operation during image capturing, as illustrated in FIG. 6, neither the A marker 222 nor the B marker 223 is displayed, and instead "A" and "B" indicating the respective set positions are displayed. The slider 220 comes near to a right end, and the display on the subject display portion 210 becomes large. Further, the setting change button 261, the cancel button 262, and the setting button 263 that are unnecessary during image capturing can be hidden. That is, the subject display portion 210 is controlled to be displayed larger and an area of the UI for various settings other than the subject display portion is controlled to be displayed smaller during image capturing than at times other than during the image capturing. It is possible to inhibit the slider button 221 from being directly dragged and dropped. That is, in order to move the slider button 221 to change the image capturing parameter, it is necessary to use the A button 240, the B button 241, the up button 250, and the down button 251.

Figure 7:
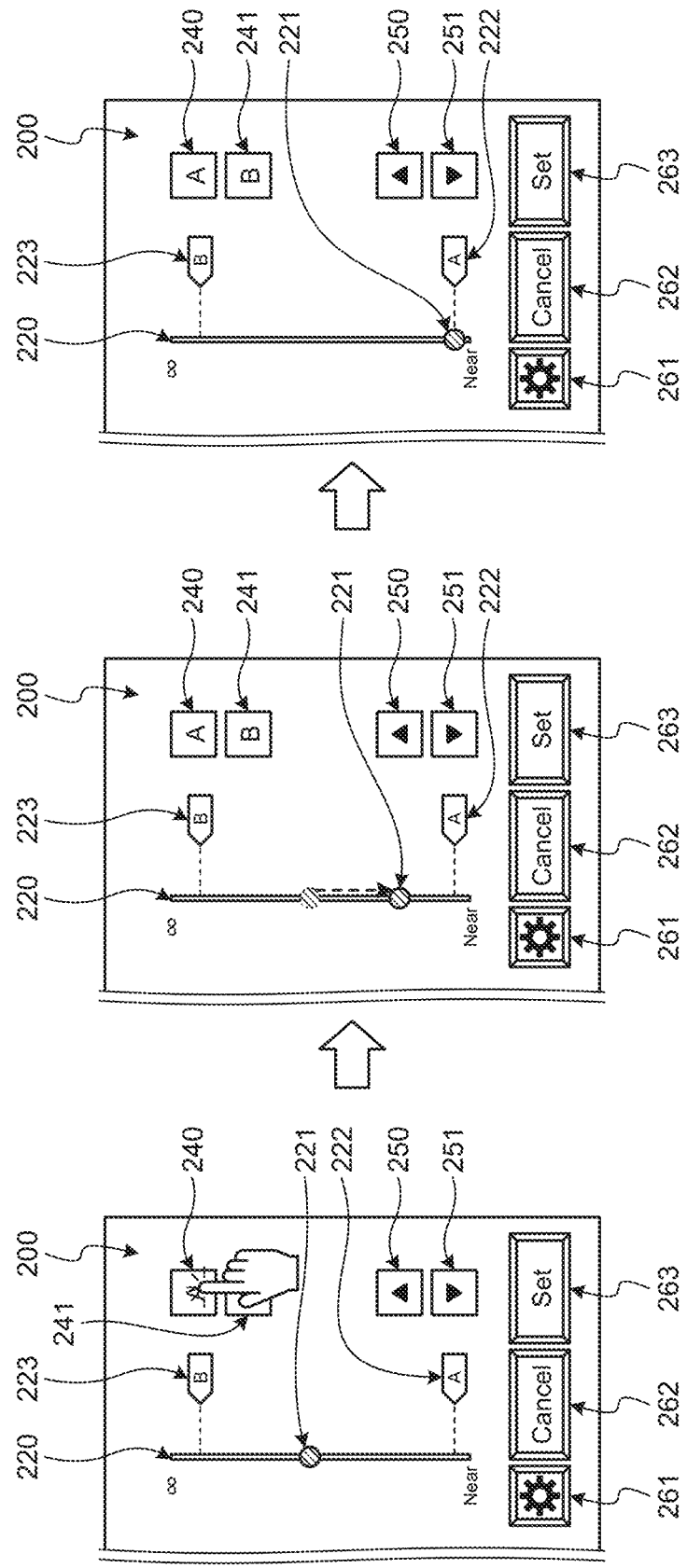
FIG. 7 illustrates an example of an operation of an image capturing parameter by the camera application according to the embodiment.

FIG. 7 illustrates an example of an operation of the image capturing parameter by the camera application according to the present embodiment. FIG. 7 illustrates a method of operating the image capturing parameter by using the A button 240 or the B button 241 during image capturing or during each marker setting by exemplifying the A button 240. Therefore, the image capturing parameter can be operated by performing a similar operation on the B button 241.

A left part of FIG. 7 illustrates a state in which the user is pressing the A button 240 in order to operate the image capturing parameter. A middle part of FIG. 7 illustrates a state in which the slider button 221 is moving toward the A marker 222 in response to the user pressing the A button 240.

In the example of FIG. 7, the initial value of the slider button 221 is near the center of the slider 220 but can be freely changed by the user.

As described above, the user can arbitrarily change a moving speed by the A button 240. For example, the moving speed of the slider button 221 can be set as an arrival time (e.g., 0.1 to 3.0 seconds) from a start position of movement of the slider button 221 to the A marker 222 or the B marker 223. For example, in a case where the arrival time is set to 1.5 seconds and the user presses the A button 240, the slider button 221 starts moving and moves at a speed at which the slider button 221 arrives at the A marker 222 in 1.5 seconds. That is, the arrival time is set regardless of a distance from the A marker 222, and thus the slider button 221 moves fast in a case where the distance from the A marker 222 is long and moves slowly in a case where the distance from the A marker 222 is short. This is because, in a case where a frame rate (the number of frames per second) is concerned in capturing of a moving image, image capturing in units of seconds is extremely important. The arrival time to the A marker 222 or the B marker 223 can be separately or uniformly set.

A right part of FIG. 7 illustrates a state in which the slider button 221 has arrived at the position of the A marker 222. The control unit 180 controls the image capturing parameter to change in accordance with the movement of the slider button 221 caused by pressing the A button 240 or the B button 241. Then, the control unit 180 operates the focus ring or the like in accordance with the change in the image capturing parameter. Therefore, the subject displayed on the subject display portion 210 changes so that the image capturing parameter is gradually reflected (e.g., the position of the subject gradually comes into focus.). For example, the pull focus technique, which is an advanced image capturing technique, can also be easily performed by pressing the A button 240 and then pressing the B button 241.

In a case where the B button 241 is pressed while the slider button 221 is moving to the A marker 222 in response to a press of the A button 240, such an operation of the B button 241 can be invalidated until the slider button 221 arrives at the position of the A marker 222 in order to prevent an erroneous operation. Alternatively, even when the slider button 221 is moving to the A marker 222, the slider button 221 may be controlled to move to the B marker 223 in response to the press of the B button 241.

Figure 8:
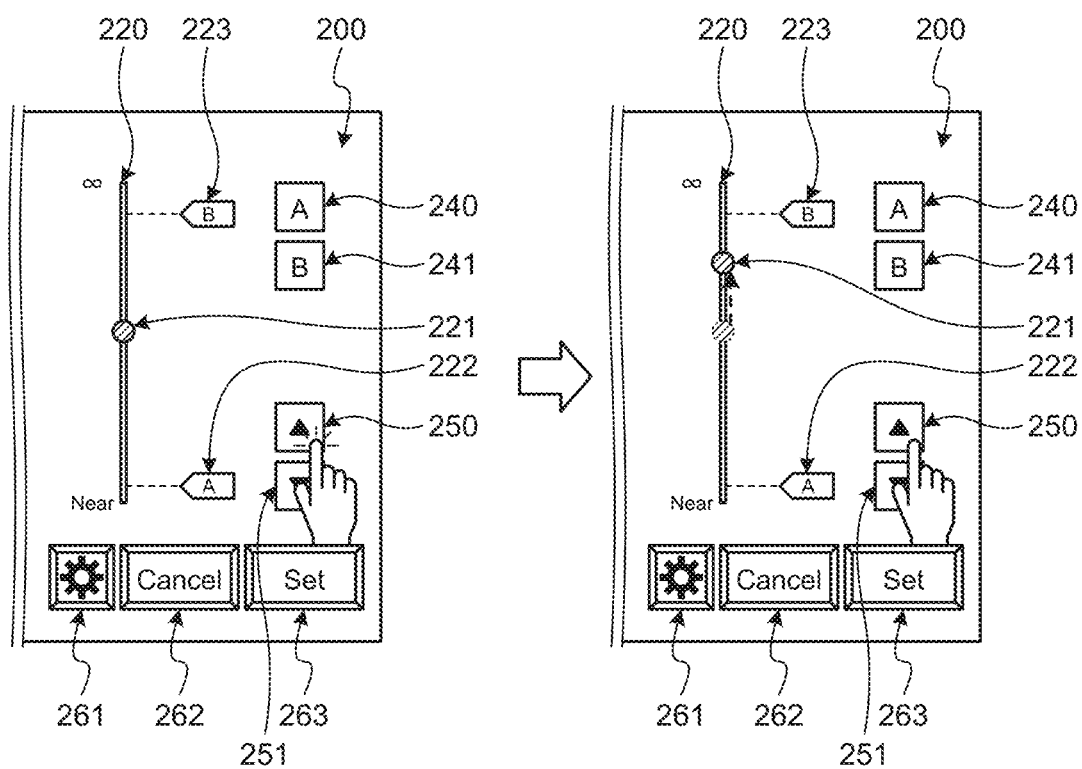
FIG. 8 illustrates an example of an operation of an image capturing parameter by the camera application according to the embodiment.

FIG. 8 illustrates an example of an operation of the image capturing parameter by the camera application according to the present embodiment. FIG. 8 illustrates a method of operating the image capturing parameter by using the up button 250 or the down button 251 during image capturing or each marker setting by exemplifying the up button 250. Therefore, the image capturing parameter can be operated by performing a similar operation on the down button 251.

A left part of FIG. 8 illustrates a state in which the user is pressing the up button 250 in order to operate the image capturing parameter. A right part of FIG. 8 illustrates a state in which the slider button 221 is moving upward along the slider 220 in response to the user pressing the up button 250.

As described above, the amount of movement of the slider button 221 by using the up button 250 or the down button 251 can be arbitrarily changed. The control unit 180 controls the image capturing parameter to change in accordance with the movement of the slider button 221 by using the up button 250 or the down button 251. Therefore, the subject displayed on the subject display portion 210 changes so that the image capturing parameter is gradually reflected, and thus the user can perform a more detailed operation of the image capturing parameter.

2. Modification Example of Embodiment

Figure 9:
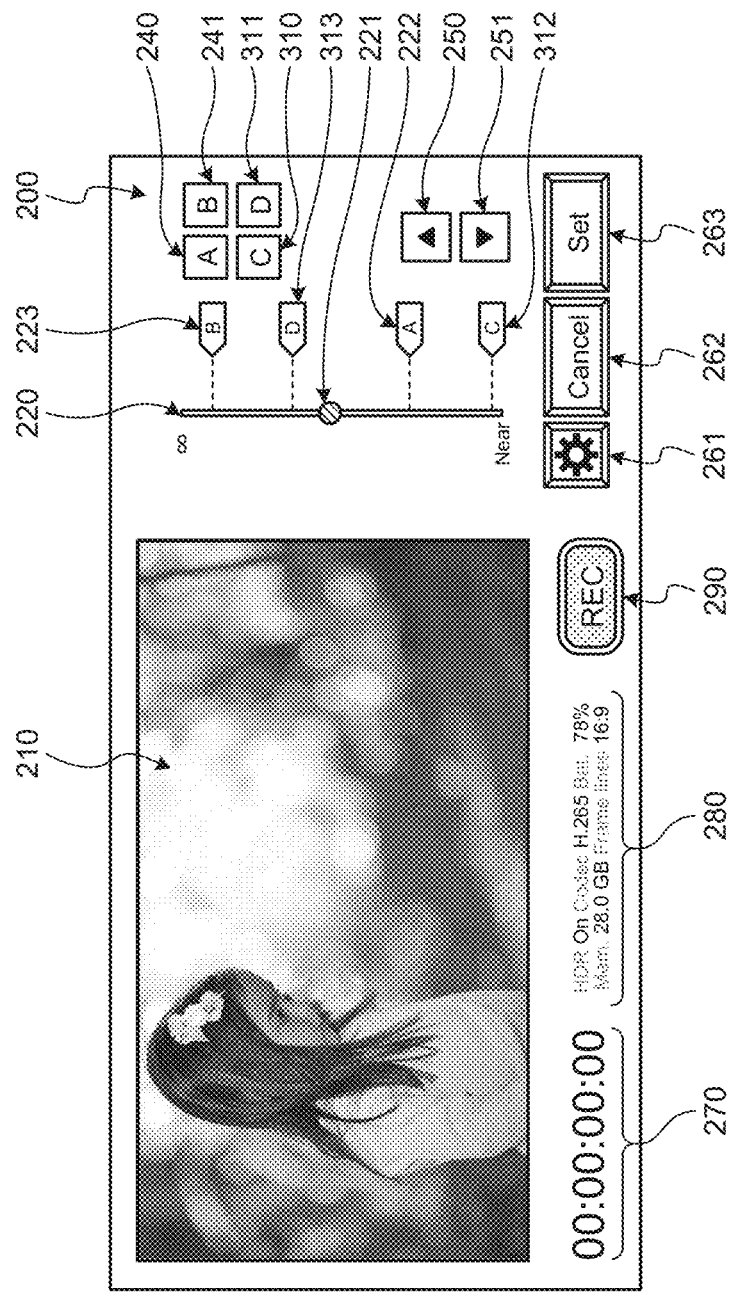
FIG. 9 illustrates a modification example of the camera application according to the embodiment.

FIG. 9 illustrates a modification example of the camera application according to the present embodiment. In the modification example of FIG. 9, the numbers of markers and buttons for operating the image capturing parameter are increased to four from two in order to perform a more detailed operation of the image capturing parameter. More specifically, a C marker 312 and a D marker 313 are added in addition to the A marker 222 and the B marker 223. A C button 310 and a D button 311 corresponding to the C marker 312 and the D marker 313 are also added. The way of using the C and D markers and buttons is similar to the way of using the A and B markers and buttons described above. For example, the user can perform image capturing while changing the image capturing parameter in more detail by sequentially pressing the A button 240, the C button 310, the D button 311, and the B button 241 during image capturing. The numbers of markers and buttons are not limited to four and may be larger or smaller than four.

3. Hardware Configuration Example

Figure 10:
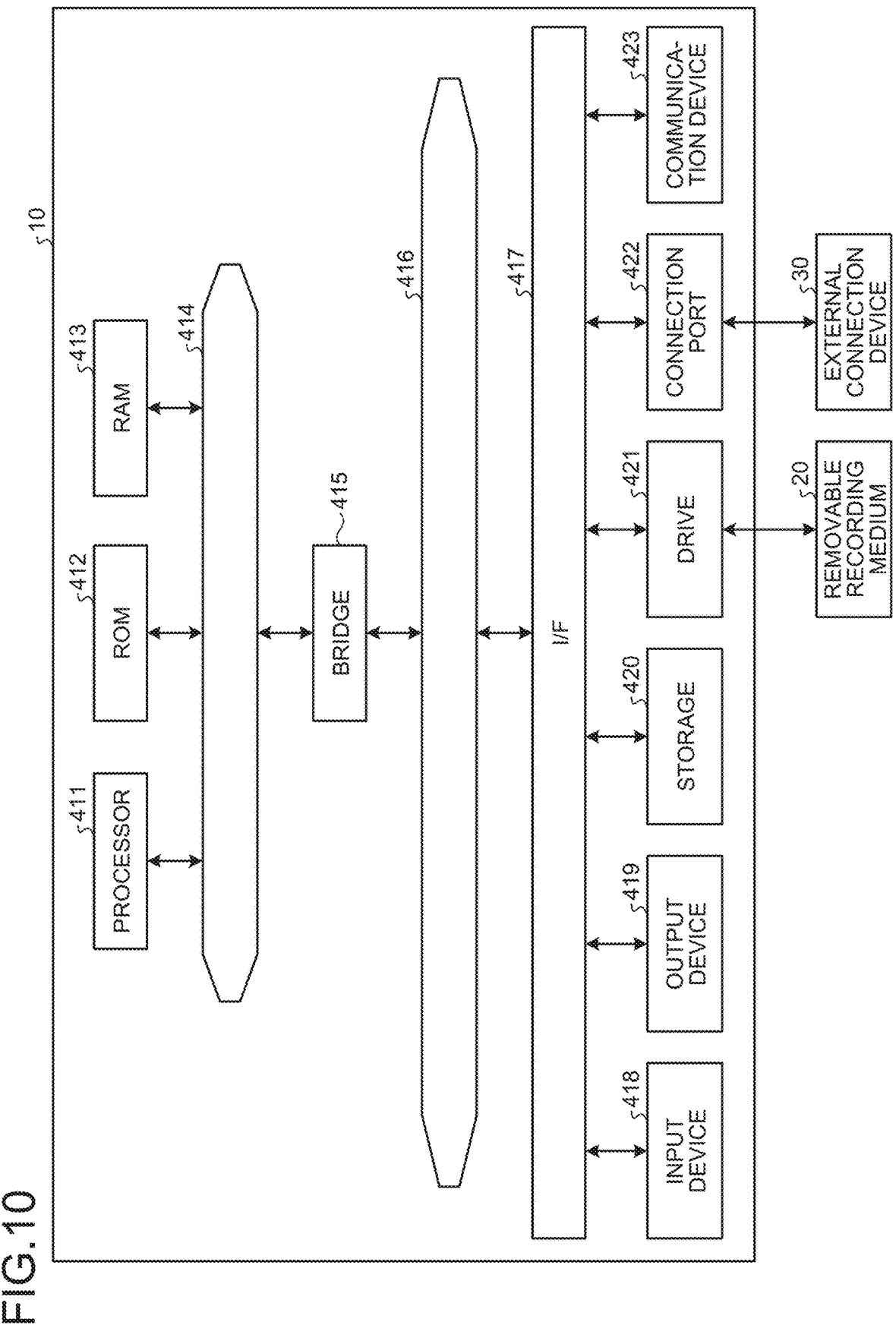
FIG. 10 is a block diagram illustrating a hardware configuration example of an information processing device 10 according to an embodiment of the present disclosure.

Next, a hardware configuration example of the information processing device 10 according to an embodiment of the present disclosure will be described. FIG. 10 is a block diagram illustrating a hardware configuration example of the information processing device 10 according to the embodiment of the present disclosure. Referring to FIG. 10, the information processing device 10 includes, for example, a processor 411, a ROM 412, a RAM 413, a host bus 414, a bridge 415, an external bus 416, an interface 417, an input device 418, an output device 419, a storage 420, a drive 421, a connection port 422, and a communication device 423. The hardware configuration illustrated herein is merely an example, and some of components may be omitted. In addition, components other than the components illustrated herein may be further provided.

(Processor 411)

The processor 411 functions as, for example, an arithmetic processing device or a control device and controls the entire or part of operation of each component on the basis of various programs recorded on the ROM 412, the RAM 413, the storage 420, or a removable recording medium 20.

(ROM 412 and RAM 413)

The ROM 412 is a means for storing programs to be read by the processor 411, data to be used for calculation, and the like. The RAM 413 temporarily or permanently stores, for example, programs to be read by the processor 411, various parameters that appropriately change when the programs are executed, and the like.

(Host Bus 414, Bridge 415, External Bus 416, and Interface 417)

The processor 411, the ROM 412, and the RAM 413 are mutually connected via, for example, the host bus 414 capable of transmitting data at a high speed. The host bus 414 is connected to, for example, the external bus 416 having a relatively low data transmission speed via the bridge 415. The external bus 416 is connected to various components via the interface 417.

(Input Device 418)

Examples of the input device 418 include a mouse, a keyboard, a touchscreen, a button, a switch, and a lever. The input device 418 can also include a remote control capable of transmitting a control signal by using infrared rays or other radio waves. The input device 418 further includes a voice input device such as a microphone.

(Output Device 419)

The output device 419 is a device capable of visually or audibly notifying the user of acquired information, and examples thereof include display devices such as a cathode ray tube (CRT) display, an LCD, and an organic EL display, audio output devices such as a speaker and a headphone, a printer, a mobile phone, and a facsimile. The output device 419 according to the present disclosure includes various vibration devices capable of outputting tactile stimulation.

(Storage 420)

The storage 420 is a device for storing various kinds of data. Examples of the storage 420 include a magnetic storage device such as a hard disk drive (HDD), a semiconductor storage device, an optical storage device, and a magneto-optical storage device.

(Drive 421)

The drive 421 is, for example, a device that reads information recorded on the removable recording medium 20 such as a magnetic disk, an optical disk, a magneto-optical disk, or a semiconductor memory or writes information to the removable recording medium 20.

(Removable Recording Medium 20)

Examples of the removable recording medium 20 include a DVD medium, a Blu-ray (registered trademark) medium, an HD DVD medium, and various semiconductor storage media. As a matter of course, the removable recording medium 20 may be, for example, an IC card or electronic device on which a non-contact IC chip is mounted.

(Connection Port 422)

The connection port 422 is, for example, a port for connecting an external connection device 30 such as a universal serial bus (USB) port, an IEEE 1394 port, a small computer system interface (SCSI), an RS-232C port, or an optical audio terminal.

(External Connection Device 30)

Examples of the external connection device 30 include a printer, a portable music player, a digital camera, a digital video camera, and an IC recorder.

(Communication Device 423)

The communication device 423 is a communication device to be connected to a network, and examples thereof include communication cards for a wired or wireless LAN, Bluetooth (registered trademark), and a wireless USB (WUSB), a router for optical communication, a router for asymmetric digital subscriber line (ADSL), and a modem for various types of communication.

4. Summary

As described above, a program causes the information processing device (10) to execute: starting image capturing by using a camera (image capturing unit 130) communicably connected to the information processing device; changing a parameter for the image capturing by using the camera to a predetermined first value during the image capturing by using the camera; and changing the parameter to a predetermined second value.

Therefore, it is possible to assist in manual operation of the image capturing parameter. This makes it possible to easily achieve a more detailed and accurate image capturing parameter operation, which in turn easily achieve an advanced image capturing technique.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these changes and modifications also belong to the technical scope of the present disclosure.

The effects described in the present specification are merely illustrative or exemplary and are not restrictive. That is, the technology according to the present disclosure can have other effects obvious to those skilled in the art from the description of the present specification in addition to or instead of the above effects.

The present technology can also have the following configurations.

(1) A program for causing an information processing device to execute changing a parameter for image capturing by a camera connected to the information processing device, to a predetermined first value in response to a first user input.

(2) The program according to claim 1, wherein the program further causes the information processing device to execute changing the parameter to a predetermined second value in response to a second user input.

(3) The program according to claim 2, wherein the program further causes the information processing device to execute storing the first value on the basis of a third user input, and storing the second value on the basis of a fourth user input.

(4) The program according to claim 3, wherein the first user input and the second user input are inputs performed during the image capturing by the camera, and the third user input and the fourth user input are inputs performed at times other than during the image capturing by the camera.

(5) The program according to claim 2, wherein a time period from a response to the first user input to a change to the first value and a time period from a response to the second user input to a change to the second value are determined in advance on the basis of a fifth user input.

(6) The program according to claim 1, wherein the parameter is a parameter regarding focus, a zoom, an f-number, or exposure of the camera.

(7) The program according to claim 1, wherein:

the parameter is a parameter regarding focus of the camera;

the program further causes the information processing device to execute displaying a subject of the camera on a display communicably connected to the information processing device, based on a sixth user input indicating a predetermined position of the subject displayed on the display, focusing on the predetermined position by autofocus; and displaying, on the display, display based on a third value of the parameter obtained when the predetermined position is in focus.

(8) The program according to claim 1, wherein:

the program further causes the information processing device to execute displaying a user interface for inputting the parameter on a display communicably connected to the information processing device; and a user input regarding adjustment of the parameter is input via the user interface.

(9) The program according to claim 8, wherein the display includes a subject display portion that displays a digitized subject, and the subject display portion is displayed larger and a region of the user interface is displayed smaller during the image capturing by the camera than at times other than during the image capturing.

(10) The program according to claim 1, wherein an initial value of the parameter at start of the image capturing by the camera is predetermined on the basis of a seventh user input.

(11) The program according to claim 1, wherein the program further causes the information processing device to execute changing the parameter to a predetermined third value.

(12) An information processing device comprising a control unit that changes a parameter for image capturing by a camera connected to the information processing device, to a predetermined first value in response to a first user input.

(13) A method, wherein an information processing device executes changing a parameter for image capturing by a camera connected to the information processing device, to a predetermined first value in response to a first user input.

REFERENCE SIGNS LIST

10 INFORMATION PROCESSING DEVICE
110 OPERATION UNIT
120 STORAGE UNIT
130 IMAGE CAPTURING UNIT
140 SENSOR UNIT
150 DISPLAY UNIT
160 SOUND INPUT UNIT
170 SOUND OUTPUT UNIT
180 CONTROL UNIT

The invention claimed is:

1. An information processing device comprising a processor configured to:

change a parameter for image capturing by a camera connected to the information processing device, to a predetermined first value in response to a first user input; and change the parameter to a predetermined second value in response to a second user input, wherein a time period from a response to the first user input to a change to the first value and a time period from a response to the second user input to a change to the second value are determined in advance on the basis of a third user input.

2. The information processing device according to claim 1, wherein the processor is further configured to:

store the first value on the basis of a fourth user input, and store the second value on the basis of a fifth user input.

3. The information processing device according to claim 2, wherein the first user input and the second user input are inputs performed during the image capturing by the camera, and the fourth user input and the fifth user input are inputs performed at times other than during the image capturing by the camera.

4. The information processing device according to claim 1, wherein the parameter is a parameter regarding focus, a zoom, an f-number, or exposure of the camera.

5. The information processing device according to claim 1, wherein the parameter is a parameter regarding focus of the camera, and the processor is further configured to:
display a subject of the camera on a display communicably connected to the information processing device;
based on a fourth user input indicating a predetermined position of the subject displayed on the display, focus on the predetermined position by autofocus; and
display the subject displayed on the display based on a third value of the parameter obtained when the predetermined position is in focus.

6. The information processing device according to claim 1, wherein:
the processor is further configured to:
display a user interface for inputting the parameter on a display communicably connected to the information processing device such that a user input regarding adjustment of the parameter is input via the user interface.

7. The information processing device according to claim 6, wherein the display includes a subject display portion that displays a digitized subject, and the subject display portion is displayed larger and a region of the user interface is displayed smaller during the image capturing by the camera than at times other than during the image capturing.

8. The information processing device according to claim 1, wherein an initial value of the parameter at start of the image capturing by the camera is predetermined on the basis of a fourth user input.

9. The information processing device according to claim 1, wherein
the processor is further configured to:
change the parameter to a predetermined third value.

10. A method, for an information processing device comprising:
changing a parameter for image capturing by a camera connected to the information processing device, to a predetermined first value in response to a first user input; and
changing the parameter to a predetermined second value in response to a second user input,
wherein a time period from a response to the first user input to a change to the first value and a time period from a response to the second user input to a change to the second value are determined in advance on the basis of a third user input.

11. The method according to claim 10, further comprising:
storing the first value on the basis of a fourth user input, and
storing the second value on the basis of a fifth user input.

12. The method according to claim 11, wherein the first user input and the second user input are inputs performed during the image capturing by the camera, and the fourth user input and the fifth user input are inputs performed at times other than during the image capturing by the camera.

13. The method according to claim 10, wherein the parameter is a parameter regarding focus, a zoom, an f-number, or exposure of the camera.

14. The method according to claim 10, wherein an initial value of the parameter at start of the image capturing by the camera is predetermined on the basis of a fourth user input.

15. An information processing device comprising a processor configured to:
change a parameter for image capturing by a camera connected to the information processing device, to a predetermined first value in response to a first user input; and
display a user interface for inputting the parameter on a display communicably connected to the information processing device such that a user input regarding adjustment of the parameter is input via the user interface,
wherein the display includes a subject display portion that displays a digitized subject, and the subject display portion is displayed larger and a region of the user interface is displayed smaller during the image capturing by the camera than at times other than during the image capturing.

16. The information processing device according to claim 15, wherein the processor is further configured to:
store the first value on the basis of a fourth user input, and
store the second value on the basis of a fifth user input.

17. The information processing device according to claim 16, wherein the first user input and the second user input are inputs performed during the image capturing by the camera, and the fourth user input and the fifth user input are inputs performed at times other than during the image capturing by the camera.

18. The information processing device according to claim 15, wherein the parameter is a parameter regarding focus, a zoom, an f-number, or exposure of the camera.

19. The information processing device according to claim 15, wherein an initial value of the parameter at start of the image capturing by the camera is predetermined on the basis of a fourth user input.

20. The information processing device according to claim 15, wherein the processor is further configured to:
change the parameter to a predetermined third value.

* * * * *